(No Model.)
W. R. PATTERSON.
JOINT FOR LEAD PIPES.
No. 309,247. Patented Dec. 16, 1884.
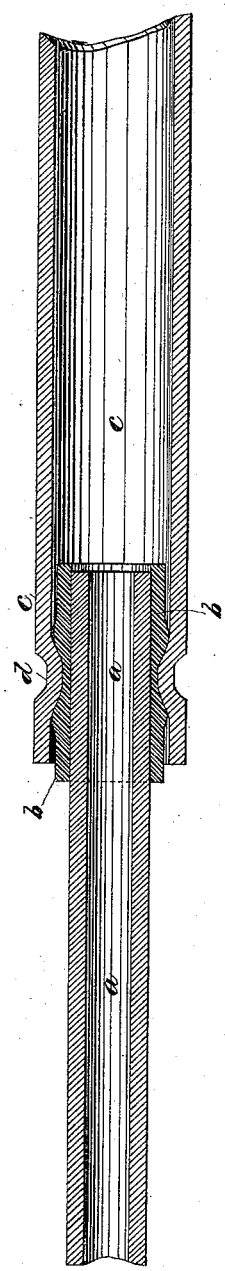

UNITED STATES PATENT OFFICE.

WILLIAM R. PATTERSON, OF CHICAGO, ILLINOIS, ASSIGNOR TO THE WESTERN ELECTRIC COMPANY, OF SAME PLACE.

JOINT FOR LEAD PIPES.

SPECIFICATION forming part of Letters Patent No. 309,247, dated December 16, 1884.

Application filed June 9, 1884. (No model.)

*To all whom it may concern:*

Be it known that I, WILLIAM R. PATTERSON, a citizen of the United States, residing at Chicago, in the county of Cook and State of Illinois, have invented a certain new and useful Improvement in Joints for Lead Pipes, (Case 36,) of which the following is full, clear, concise, and exact description, reference being had to the accompanying drawing, forming a part of this specification.

My invention relates to joints for lead pipes, and is of special advantage when two pipes of different diameters are to be united by an airtight joint.

My invention consists in placing a rubber sleeve or packing about the end of the smaller pipe and slipping the larger pipe over this sleeve, and then forcing the outer pipe about the rubber sleeve by means of a roller or other suitable device, as herein described. I preferably use an ordinary pipe-cutter, with a blunt roller substituted for the cutter, to force the outer pipe against the rubber sleeve. The groove thus formed may be left without filling in case the larger pipe forms a part of the terminal. If, however, the joint is liable to be bent, I fill the groove with solder by the ordinary process of wiping. If the cable is liable to longitudinal strain, I make the groove in the outer pipe so deep as to indent the inner pipe.

In laying cables the different sections are united by sleeve-joints, and I have found that much time is saved by making the joints, as herein described, as temporary connections, and then allowing the plumber to wipe the joints after several sections are laid. I have also made use of the joint herein described in connection with my hydrostatic press described in my application No. 125,219, filed March 22, 1884. The cylinder of the press may be extended in either direction by means of a sleeve expanded at one end and clamped to the cylinder, and made tight at the other end about the pipe of the cable to be tested.

My invention is illustrated in the accompanying drawing, in which I have shown a longitudinal sectional view of two lead pipes united by my joint. A smaller pipe, $a$, is provided with the rubber sleeve or packing $b$. The larger lead pipe $c$ is placed over the rubber packing, and then, by means of a suitable tool, the groove $d$ is formed, which compresses the rubber, and also, if desired, the inner pipe.

The tool which I have used for making the groove is an ordinary pipe-cutter with a blunt wheel substituted for the sharp wheel or knife of the pipe-cutter.

I claim—

The combination, with the pipe $a$, of the rubber sleeve or packing $b$ and the pipe $c$, surrounding the rubber sleeve, and indented, so as to form a groove, $d$, which pinches the rubber between the two pipes, forming a tight joint, substantially as and for the purpose specified.

In witness whereof I hereunto subscribe my name this 5th day of June, A. D. 1884.

WILLIAM R. PATTERSON.

Witnesses:
GEORGE P. BARTON,
JOSEPH JENNINGS.